though
3,073,832
Patented Jan. 15, 1963

3,073,832
C-DIHYDROTOXIFERIN DIHALIDES AND A PROCESS FOR THEIR PREPARATION
Karl Bernauer, Kilchberg, and Paul Karrer and Hans Schmid, Zurich, Switzerland, assignors to Hoffmann-La Roche Inc., Nutley, N.J., a corporation of New Jersey
No Drawing. Filed Jan. 26, 1960, Ser. No. 4,603
Claims priority, application Switzerland Jan. 30, 1959
8 Claims. (Cl. 260—293)

This invention relates to novel chemical processes, and to novel intermediates useful in practicing said processes. More particularly, the invention relates to novel processes and intermediates for the preparation of synthetic compounds related to certain Strychnos alkaloids.

In one of its aspects, the invention provides a process which comprises reacting (a) a member selected from the group consisting of caracurin V, which can be represented by the following formula

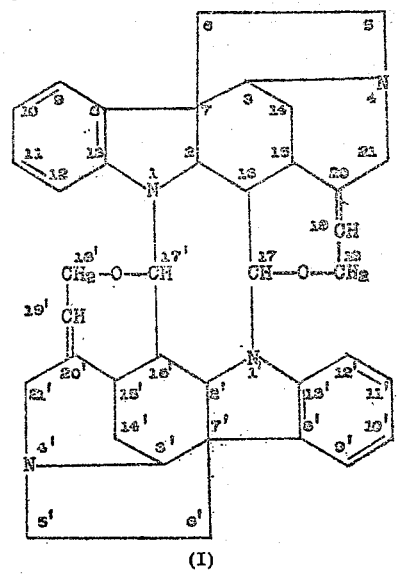

(I)

and caracurin Va, which can be represented by the following formula

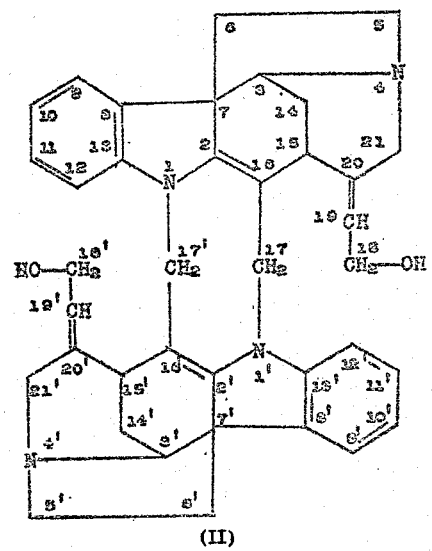

(II)

and the $N^4$- and $N^{4'}$-mono- and bis-quaternary salts of caracurin V and caracurin Va with pharmaceutically accepting quaternizing agents, and (b) a hydrogen halide selected from the group consisting of hydrogen chloride and hydrogen bromide, thereby forming a novel intermediate represented by the following general formula

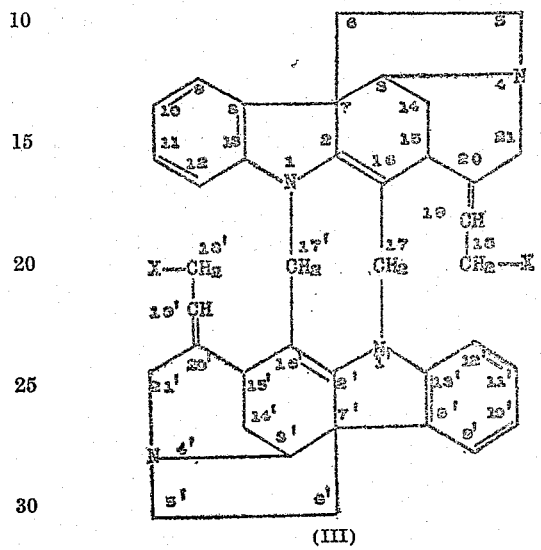

(III)

wherein X represents a middle halogen, i.e. chlorine or bromine; hydrogenolyzing said intermediate; and, if desired, converting tertiary bases obtained by the hydrogenolysis to their acid addition salts with pharmaceutically acceptable acids, or to their $N^4$- and $N^{4'}$-mono- and bis-quaternary salts with pharmaceutically acceptable quaternizing agents.

Pharmaceutically acceptable acids include inorganic and organic acids commonly encountered in pharmaceutical practice, such as hydrochloric acid, hydrobromic acid, hydriodic acid, sulfuric acid, phosphoric acid, oxalic acid, tartaric acid, toluenesulfonic acid, methanesulfonic acid, picric acid and the like. Pharmaceutically acceptable quaternizing agents include those quaternizing agents commonly encountered in pharmaceutical practice, such as lower alkyl-, lower alkenyl- and aralkyl halides and -sulfates having not more than seven carbon atoms, e.g. methyl iodide, methyl bromide, ethyl bromide, allyl bromide, dimethylsulfate, benzyl chloride and the like.

By the processes of the invention there are obtained nordihydrotoxiferin and corresponding acid addition salts and mono- and bis-quaternary salts, e.g. C-dihydrotoxiferin salts. The products of the processes of the invention are crystalline compounds and are useful as medicinal agents. More particularly, the bases and acid addition salts are useful as sedatives, in consequence of their marked depressant action upon the central nervous system. The quaternary salts are useful as curarizing agents, in consequence of their curarimimetic activity.

An especially useful hydrogen halide to be employed in the first step of the above described process is hydrogen bromide. When using the latter, it is recommended to conduct the reaction in an inert solvent, e.g. glacial acetic acid. Advantageously, precautions are taken to exclude light and moisture from the reaction mixture. It is convenient to conduct the halogenation reaction at room temperatures.

The second step referred to in the above described process comprises a hydrogenolysis reaction to eliminate the 18- and 18'- halogen substituents and replace the same by hydrogen. Such hydrogenolysis is advantageously accomplished by treating the 18,18'-dihalo-intermediate with zinc dust and glacial acetic acid.

Tertiary bases obtainable by the above two-step (halogenation-hydrogenolysis) process can be converted to their acid addition salts by treating the tertiary bases in inert solvents, e.g. benzene, with the desired quaternizing agent. Similarly, the tertiary bases can be converted to acid addition salts, if desired, by treating the tertiary base in inert solvent medium with the desired acid.

Also, the salts obtained as described above can be converted to still other salts by ion exchange methods, whereby the original acid anion is exchanged for a different acid anion.

The products obtained by the processes of the invention can be purified by conventional methods, e.g. by chromatography or by fractional crystallization, e.g. by way of the difficulty soluble diiodides and dipicrates.

The invention is further disclosed in the following examples, which are illustrative but not limitative thereof. All temperatures are in degrees centigrade.

*Example 1*

While stirring, a solution of 96 mg. of caracurin V in 1 ml. of glacial acetic acid is dropped, over a period of 10 minutes, into 30 ml. of a hydrogen bromide/glacial acetic acid solution (saturated solution at 0°, diluted 3:100). The yellow solution is kept at room temperature for 62 hours with exclusion of light and moisture. Then the reaction mixture, in which a slight amount of precipitate has separated, is dried in vacuo at 40°. The residue, comprising essentially the 18,18'-dibromide of the following formula (IV)

is shaken for 90 minutes with 50 ml. of glacial acetic acid and 5 g. of zinc dust; then, after addition of 10 ml. of absolute methanol, the reaction mixture is shaken for an additional period of 30 minutes. The mixture is filtered and the residue is washed with a large volume of methanol. The filtrate is evaporated in vacuo, dissolved in water, mixed with aqueous ammonia and then extracted exhaustively with chloroform. The chloroform extract is chromatographed in benzene solution on 15 g. of aluminum oxide (Brockmann, 12% water), checking the eluates by paper chromatography and isolating nor-dihydrotoxiferin from the fractions containing same. The nor-dihydrotoxiferin obtained is converted to C-dihydrotoxiferin diiodide by treatment with methyl iodide in benzene. The diiodide is recrystallized from acetone/water and converted to C-dihydrotoxiferin dichloride by passage through a polystyrene quaternary amine type anion exchange resin (Amberlite IRA-400) in chloride form. The dichloride product is recrystallized twice from methanol-ether and then has $a_D^{20} = -605 \pm 5°$ (c.=0.377; 50% ethanol). The C-dihydrotoxiferin dichloride obtained can be converted to C-dihydrotoxiferin dipicrate in known manner. Upon a single recrystallization of the latter from acetone/water, the recrystallized product exhibits M.P. 180–185°.

*Example 2*

100 mg. of caracurin Va is dissolved in 1 ml. of glacial acetic acid and mixed with 30 ml. of hydrogen bromide/glacial acetic acid (saturated solution at 0°, diluted 3:100). After 60 hours, the reaction mixture is evaporated in vacuo and worked up further according to the indications in Example 1. The nor-dihydrotoxiferin obtained is quaternized and identified as C-dihydrotoxiferin dichloride in the manner indicated in Example 1.

*Example 3*

100 mg. of C-toxiferin dichloride is dissolved in 1 ml. of glacial acetic acid and to the solution is added 50 ml. of hydrogen bromide/glacial acetic acid (saturated solution at 0°, diluted 3:100). After 60 hours, the reaction mixture is evaporated in vacuo. The residue is shaken for 90 minutes with 100 ml. of glacial acetic acid and excess zinc dust, then 20 ml. of absolute methanol is added and the shaking is continued for an additional period of 30 minutes. The reaction mixture is filtered and washed with absolute methanol. The combined liquids are evaporated in vacuo and the residue is taken up with water. The alkaloid mixture is precipitated from the aqueous solution by means of aqueous picric acid solution and then the picrates obtained are converted to the corresponding chlorides by ion exchange. C-dihydrotoxiferin dichloride is separated by crystallization and purified by recrystallization from methanol/ether.

In similar manner, caracurin V dimethochloride can be converted to C-dihydrotoxiferin dichloride.

We claim:

1. A process which comprises reacting (a) a member selected from the group consisting of caracurin V and caracurin Va and their mono- and bis-quaternary salts with pharmaceutically acceptable quaternizing agents having not more than 7 carbon atoms selected from the group consisting of lower alkyl halide, lower alkenyl halide, aralkyl halide, lower alkyl sulfate, lower alkenyl sulfate, and aralkyl sulfate, and (b) a hydrogen halide selected from the group consisting of hydrogen chloride and hydrogen bromide; and hydrogenolyzing the so-formed 18,18'-dihalo reaction product of the preceding step with zinc dust and glacial acetic acid, thereby forming the corresponding compounds selected from the group consisting of nor-dihydrotoxiferin, pharmaceutically acceptable acid addition salts thereof and mono- and bis-quaternary salts thereof with pharmaceutically acceptable quaternizing agents having not more than 7 carbon atoms selected from the group consisting of lower alkyl halide, lower alkenyl halide, aralkyl halide, lower alkyl sulfate, lower alkenyl sulfate, and aralkyl sufate.

2. A process which comprises reacting caracurin V with hydrogen bromide in glacial acetic acid, and hydrogenolyzing the so-formed 18,18'-dibromo reaction product with zinc and glacial acetic acid, thereby forming nor-dihydrotoxiferin.

3. A process which comprises the steps of claim 2 and an additional step of reacting the nor-dihydrotoxiferin with a lower alkyl halide.

4. A process which comprises reacting caracurin Va with hydrogen bromide in glacial acetic acid, and hydrogenolyzing the so-formed 18,18'-dibromo reaction product with zinc and glacial acetic acid, thereby forming nor-dihydrotoxiferin.

5. A process which comprises the steps of claim 4 and an additional step of reacting the nor-dihydrotoxiferin with a lower alkyl halide.

6. A process which comprises reacting C-toxiferin dichloride with hydrogen bromide in glacial acetic acid and hydrogenolyzing the so-formed 18,18'-dibromo reaction product of the preceding step with zinc dust and glacial acetic acid, thereby forming C-dihydrotoxiferin dichloride.

7. A process which comprises reacting caracurin V dimethochloride with hydrogen bromide in glacial acetic acid and hydrogenolyzing the so-formed 18,18-dibromo reaction product of the preceding step with zinc dust and glacial acetic acid, thereby forming C-dihydrotoxiferin dichloride.

8. A compound of the formula wherein the symbol X represents a radical selected from the group consisting of bromo and chloro.

References Cited in the file of this patent

Bernauer et al.: Helvetica Chimica Acta, volume 41, pages 2293–2308 (December 1958).